United States Patent
Luchetta

[11] 3,851,225
[45] Nov. 26, 1974

[54] WATER RESISTANT BALLAST CONSTRUCTION

[75] Inventor: Julius Frank Luchetta, Elmhurst, Ill.
[73] Assignee: Limited Systems, Inc., Bellwood, Ill.
[22] Filed: June 7, 1973
[21] Appl. No.: 367,925

[52] U.S. Cl............... 317/120, 174/DIG. 2, 336/92, 336/96
[51] Int. Cl. .......................................... H02b 1/12
[58] Field of Search ................... 336/90, 61, 92, 96; 174/DIG. 2, 50, 52 R; 317/120

[56] References Cited
UNITED STATES PATENTS

| | | | |
|---|---|---|---|
| 2,457,023 | 12/1948 | Zelt................................ | 174/DIG. 2 |
| 2,741,528 | 4/1956 | Clark et al........................ | 174/DIG. 2 |
| 2,815,492 | 12/1957 | Henderson......................... | 336/90 X |
| 2,858,357 | 10/1958 | McCulloch ...................... | 174/DIG. 2 |
| 2,894,232 | 7/1969 | Knobel............................ | 174/DIG. 2 |
| 3,049,579 | 8/1962 | Sulzer............................ | 174/DIG. 2 |
| 3,484,535 | 12/1969 | Luchetta......................... | 174/52 R |

Primary Examiner—Thomas J. Kozma
Attorney, Agent, or Firm—Ronald M. Goldman

[57] ABSTRACT

A ballast assembly includes a novel container construction in which sheet metal material is folded into a generally rectanguloid configuration revealing seams between adjacent side wall portions, a lid is provided to close the upper side of the container, and the bottom surface includes an embossed portion, which appears externally, and a well portion, which appears internally, such as formed by drawing the sheet metal material of the bottom side. Suitably the well portion is approximately just large enough to receive the protruding coil portion of the ballast transformer intended for that container, allowing the winding to contact the well bottom.

2 Claims, 6 Drawing Figures

3,851,225
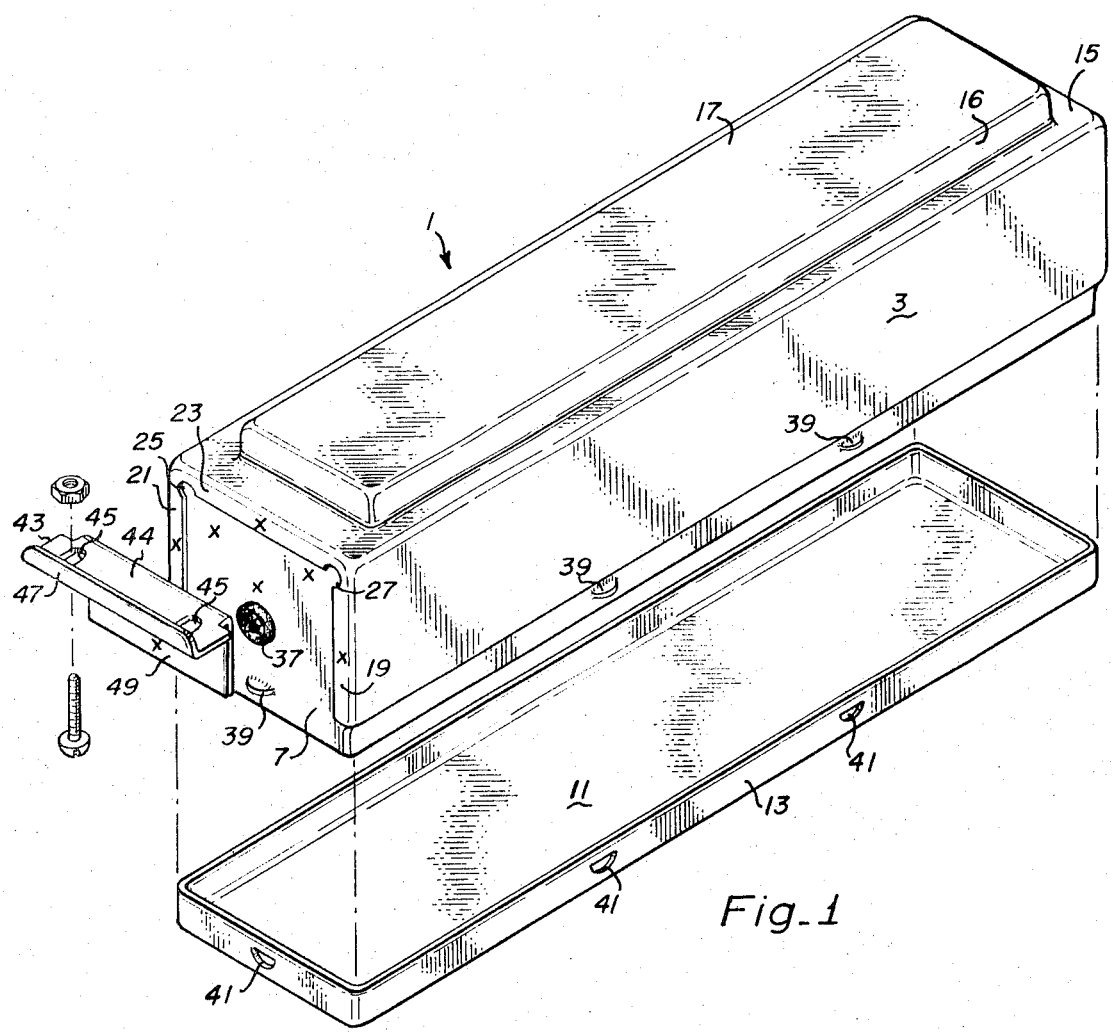
Fig_1
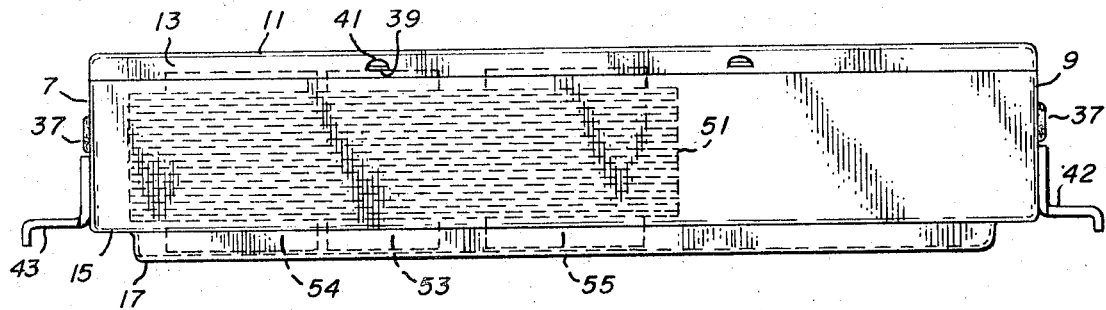
Fig_2

WATER RESISTANT BALLAST CONSTRUCTION

FIELD OF THE INVENTION

My invention relates to a lamp ballast assembly for use with fluorescent lamps or other gaseous discharge devices and, more particularly, to a ballast container having water resistant qualities obtained with inexpensive structure.

BACKGROUND OF THE INVENTION

The electrical transformer apparatus used to operate fluorescent lamps and other gaseous discharge lighting devices as well as the conventional electric circuits and components desired are supplied and sold in a closed metal container. Typically the transformer, the capacitors and other common components are inserted in place within the metal container, are properly connected together in a known electrical circuit, the leads, through which the ballast is connected to circuitry in the fluorescent lamp fixture, are extended through openings in the container, and an electrically insulative filler material, such as asphalt or a thermosetting type fill material, in liquid phase is poured into the container to fill any remaining voids within the defined container volume, the filler is coated, solidifies, and the container is closed with a lid, which then forms one of the container walls. And that unitary package is commonly referred to as the "ballast."

A number of different mechanical designs for such metal ballast containers have heretofore been commercially used. The reader may be familiar with such designs or, if not, these designs can be found in the literature, including patent literature, magazines and product catalogs. These mechanical designs are influenced by a number of factors and those factors are related to the conditions to which the ballast is subjected as well as the expense of manufacture.

For example, ballasts used in lighting fixtures located indoors, commonly in the home, factory, or office, are not exposed to rain, snow or the elements. On the other hand, ballasts located outdoors in illuminated plastic advertising signs, such as may be found at the local gas station, are exposed to rainwater, as hereinafter becomes apparent.

The outdoor plastic sign typically includes a support surface, such as a frame, lamps, ballast apparatus mounted in the frame, and translucent plastic sides containing advertising appears whereby the light produced inside the frame illuminates the plastic and makes the advertising visible to the passerby. The ballast is mounted in the frame on either a horizontal or vertical support surface. Standard practice requires that the ballast container be in contact with the support so that heat generated in the ballast during use can be more easily conducted to the support and thereby dissipated in the environment.

One having no experience in these applications might incorrectly assume that the inside of the plastic sign provides an environment totally protected from the environment, one that may be kept free of water. One inexperienced might also assume that the metal container and asphalt filler material might also serve to protect the electrical components potted in the ballast even if water did reach the ballasts. Considering the long life and high degree of reliability desired of a ballast, such assumptions are indeed incorrect.

Thus cracks or gaps appear in the plastic sign or its frame which, in a rainstorm, allows some water to enter. This water runs down along the frame sides to the frame bottom. Drain holes are provided at the frame bottom to permit such water to exit and prevent such rainwater from accumulating in the interior of the sign. However over long periods of time dead bugs, dirt and other debris can accumulate in the bottom of the sign and clog the drain holes. Thus rainwater entering the sign in such case does allow some amount of water to accumulate, temporarily, as the water slowly bleeds out through the debris or until such water eventually evaporates.

Where the ballast is mounted along a vertical frame support, rainwater entering the interior of the sign may run down the support and hit and wet the ballast container. Alternatively, where the ballast is mounted on the bottom frame support any accumulation of water will wet or partially submerge the ballast.

The metal container of the indoor type ballast is of the most inexpensive construction and includes a sheet metal material which is bent and folded into a generally rectangular shape with the walls joined together at seams. These seams are easily penetrated by water which is of no concern if the ballast is used indoors as intended. As previously noted, the contents of the container are "potted" with a filler of electrically insulative material primarily for providing a heat conducting path between the transformer and the outside. The filler, although somewhat water repellant, is porous and eventually with enough water over a sufficient period of time the filler saturates with water and this in turn results in burnout and failure of the transformer.

In my prior invention, described in U.S. Pat. No. 3,484,535, issued Dec. 16, 1969, I provide a metal container made from sheet metal and drawn into a bathtub shape. The container of that invention eliminates the leaky seams of the folded metal container construction and provides a virtually leakproof container.

The ballast construction of my earlier invention has in practice virtually eliminated failures attributed to water leakage. Regrettably, the process of making that ballast container is considerably more expensive than the conventional indoor ballast containers of folded metal construction and its cost to the customer is necessarily higher. Understandably outdoor plastic sign manufacturers are reluctant to incorporate that seamless ballast in other than applications having the most demanding environments for which their customer are willing to pay a premium for reliable operation and long service life.

OBJECTS OF THE INVENTION

In my opinion a need exists for a ballast container that provides water leak-resistant qualities, perhaps to a lesser degree inherent in my earlier invention, and which may be manufactured and assembled at less cost than the aforementioned ballast. And it is thus an object of my invention to provide such a leak-resistant ballast container.

BRIEF SUMMARY OF THE INVENTION

In accordance with that object I have discovered that the desired qualities may be achieved essentially by a simple modification of an indoor ballast container design of the folded sheet metal variety. Broadly viewed, given a rectangular-shaped metal container design with seams, but shorter in height than is standard for a given transformer, I "drew" a certain portion of the bottom surface to form an embossed or raised portion therein on the other surface and raise the overall container height to the standard level. There is thus a folded sheet metal container having seams that are essentially leaky and a protruding bottom surface portion that is seamless. The seamless embossed portion spaces the seams of the container a predetermined distance from any support surface to which the ballast is mounted. Thus when mounted in a position on a vertical support in a plastic sign, water running down the support is incident on the seamless embossed portion and cannot leak into the container. When mounted to a horizontal support on the bottom of a plastic sign, the accumulation of water in the sign must be of a sufficient depth before it reaches the level of the seams through which water leakage may occur.

At first glance my invention may appear to be merely comparable to the obvious, yet more expensive, expedient of attaching a metal spacer to the bottom surface of a standard ballast container, such as by welding a solid metal plate to the container bottom to space the container from any support surface. However, in this construction the formation of the embossed portion as viewed from outside the container by drawing the metal, results in the formation concurrently of a "well" on the inside of the container. The size of this well is made sufficiently large enough to receive the sides of the coils of the ballast transformer placed within the container. Preferably the depth of the well is small enough to allow contact with the transformer coil sides to enhance heat transfer to the metal of the container.

As now becomes apparent, the inner volume of the ballast container is reduced, as compared to a ballast container of an essentially rectanguloid shape, and yet the volume is sufficient to receive the same standard ballast transformer. This is in the nature of having a savings in volume by packaging a baseball in a spherical container instead of a rectanguloid box. This savings of "packaging volume" for the ballast transformer provides the additional benefit of reducing the amount of dielectric filler material normally provided to fill the voids in the ballast container, and thereby achieves additional cost reduction benefits. Obviously such a result is not possible with a container construction having simple metal spacer attached in the bottom surface.

The advantages and structure characteristic of my invention as brought out in the foregoing description as well as modifications thereof and equivalents thereto, which become apparent to those skilled in the art, are better understood by giving consideration to the detailed description of the preferred embodiment of my invention which follows considered together with the illustrative figures of the drawings:

DESCRIPTION OF DRAWINGS

In the drawings:

FIG. 1 illustrates an embodiment of my invention in an inverted position and in exploded perspective;

FIG. 2 illustrates a rear side view of the embodiment of my invention in FIG. 1:

DETAILED DESCRIPTION OF INVENTION

Figure 3:
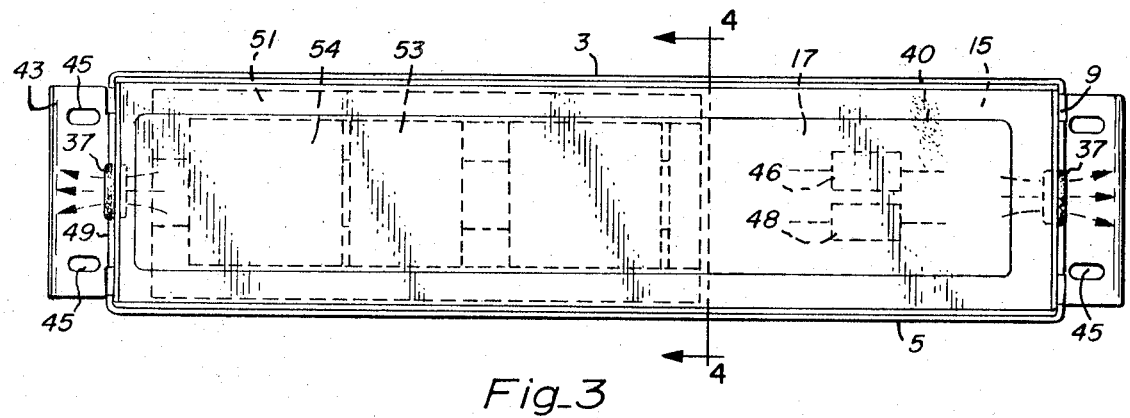
FIG. 3 illustrates a top view of the embodiment of FIG. 2 with a top wall omitted.

For clarity I have illustrated the novel container 1 in FIG. 1 in an inverted position and in exploded perspective. Container 1 is of an elongated generally rectanguloid shape and has its walls formed from sheet steel material. The elongated container is hollow inside and includes a front side wall 3, a back side wall 5, not visible in this figure, a left end wall 7 and a right end wall 9, not visible in this figure. A top wall 11 is shown in exploded position and consists of a detachable lid or cover. A bottom wall 15 includes a raised surface or embossed portion 17, centrally located, which covers the major bottom surface area of the container and provides an essentially flat outer surface. As is noted in the figure, the raised portion 17 is connected integrally by sides 16 with the remainder of the bottom wall so as to provide a seamless juncture therewith. This is achieved by a conventional metal drawing process in which the metal is simply pushed out from the sheet metal and deforms without cracking. Inasmuch as the embossed portion 17 is pushed or drawn out from the sheet material of the bottom wall 15, a recessed portion or "well," as variously termed, is concurrently formed on the inside bottom of the container. The front and rear side walls 3 and 5 have formed integrally thereon flaps 19 and 21 and bottom wall 15 has formed integrally thereon a flap 23. These flaps are folded around substantially perpendicular to the plane of the walls to which they are integrally attached. Circular cutout portions 25 and 27 are formed in the manufacturing process at the locations joining flaps 21 and 23 and flaps 19 and 23, respectively, so as to avoid crimping the corners of the material during the folding operation. Identical flaps, not visible in this view, corresponding to flaps 19, 21 and 23, are included at the right end of the container of FIG. 1. In my preferred embodiment I form the right and left side walls in a separate piece and the end walls are connected by spot welds to the aforementioned flaps. Thus spot welds are made at each of the locations on the flaps represented by a small x, one on each flap, to hold the end wall 7 in place. As is apparent, a water penetrable gap or seam between the flaps and the end walls of the container is inherent.

A circular opening is included in end wall 7 and a feed-through grommet 37 is included to provide a lead wire exit at this left end for at least three insulated electrical leads that extend from the electrical circuitry normally included in the container. The grommet cooperates with the lead insulation to form a water-resistant exit. A like opening and like feed-through grommet appears, not visible in this view, in the other end wall 9, not visible in this figure, for similarly providing a lead wire exit for at least three leads.

The metal lid 11, shown in exploded position, includes a depending rim 13 which fits over the side walls of the container.

It is noted that the flaps 19 and 21 extend only to within a predetermined distance of the upper edge of end wall 7. This allows clearance for the rim 13 of lid 11 to be seated in place.

A series of protrusions 39 are formed along the upper edges of the container walls, only three of which are visible in this view, and a series of corresponding openings of indentations 41 in rim 13 of lid 11 are provided to attach the lid to the container. Hence when the lid is installed in place atop the container and is pushed down the protrusions 39 snap into the openings 41 to form a catch and this holds the lid in place.

A mounting bracket 43 shown in exploded position is provided at the left end of the container. A like bracket is provided at the right end but is not visible in this figure. This bracket includes a horizontal portion 44, having bolt holes 45, a downwardly extending lip 47, and an attaching flange surface 49. Basically this is the same mounting bracket which I have illustrated in my prior patent U.S. Pat. No. 3,484,535, and which I refer to as a "double-nutting" bracket. As is illustrated in the figure, the flange 49 is attached to the end wall 7 of the container by spot welding at at least three locations indicated by a small $x$ on the flange and on the end wall 7.

The metal container leads and brackets are formed by means of conventional metal stamping, drawing and forming operations. Thus lid 11 is blanked from thin metal sheet material and is then folded to shape. Likewise the front, rear, and bottom walls are blanked from a single sheet metal material and folded over as shown and then the bottom surface may be drawn to form the protrusion 17. The right and left side walls are likewise stamped out of sheet metal and welded in place as previously described.

When completed the metal container and lid are covered with a paint. Such a paint may initially cover the various seams formed in the metal between the flaps 19, 21 and 23 and the surface of wall 7 to provide initially some degree of water resistance. However, with expansion and contraction of the container due to temperature change, the paint flakes off leaving exposed the seams. As is hereinafter explained in greater detail, the depth of the well formed by the embossed portion 17 on the inside of the container and its width bear certain relationships to the geometry of the ballast transformer intended to be enclosed in this container. This is better understood by considering the side and top views of FIGS. 2 and 3, respectively, as well as the cross section side view of FIG. 4. For convenience the elements that appear in these figures which are the same as shown and labeled in FIG. 1 are identically labeled.

Figure 4:
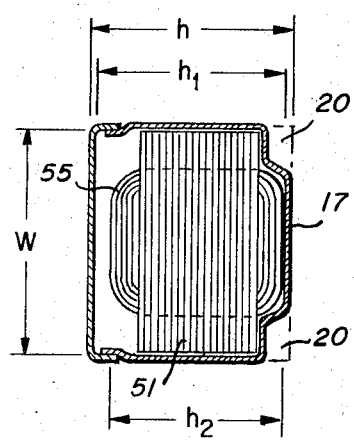
FIG. 4 illustrates a cross section of the embodiment of FIG. 3 taken along the lines 4—4.

In flipping over the container of FIG. 1 and assembling the container parts together the container is viewed in FIG. 2 from the rear wall 5, not visible in FIG. 1, and in both FIGS. 2 and 3, the right end wall 9 and side walls 3 and 5 are noted. Inasmuch as the component elements of the container have been described previously in connection with the description of FIG. 1, reference may be made to that description for any necessary review to avoid undesired repetition. In FIG. 4 a section is taken along the line 4—4 in FIG. 3 and includes the cover. The ballast transformer to be enclosed is in FIG. 2 represented by dash lines. Such transformer is an elongated shell-type of conventional structure that includes a magnetic core portion 51 formed of a stack of thin magnetic iron laminations, a primary winding 53, and first and second secondary winding 54 and 55. The windings are insulated coils of wire with the coils having a somewhat rectangular shape. To be definitive it is noted that I refer to the height of the container inside to be the distance between the inside surface of the lid to the bottom inside surface of the "well" formed by the embossed portion. This is represented by the dimension $h_1$ in FIG. 4. It is noted, however, that the outside height, $h$, of the container differs only slightly from the inside height, essentially by twice the thickness, $\Delta t$, of the sheet material forming the lid and bottom wall and is precisely $h_1+2\Delta t$. Likewise I refer to the width of the metal container as the distance between the inner surfaces of opposed front and rear walls 3 and 5. This is represented by the dimension $w$ in the cross section view of FIG. 4. It is also noted here that the width so measured differs only slightly from that measured between the outside surfaces of those same walls, differing by the wall thickness $\Delta t$.

The length dimension of the container overall need not be further defined other than to note that the container is longer in dimension than the length of the ballast transformer, the longest dimension of the transformer, as illustrated in the top view of the ballast, with cover 13 omitted, in FIG. 3. This allows space therewithin for the transformer, represented by dash lines, and capacitors 46 and 48, represented by dash lines, and circuit wiring including the leads which extend through the grommets 39 and 37 normally provided in a complete lamp ballast. It is noted that the potting material found in a complete ballast to fill any voids remaining in the container is represented in FIG. 3 by the dots 40.

The height dimension of the transformer, as represented by the symbol $h_2$ in FIG. 4, is the distance between the upper and lower peripheral surfaces of the transformer windings. Moreover the width of the transformer is the side to side distance between the edge of the lamination 51 which extends parallel to wall 3 and the opposed edge which extends along wall 5.

As is apparent from FIGS. 2 and 4, the height of the windings, $h_2$, is slightly less than the total inside height of the container, $h_1$. This is to allow a clearance, on the order of 1/8th inch, on the top side for conventional electrical terminals, not illustrated. Moreover a portion of the outer peripheral surface of the windings rests on the bottom of the internal well formed by the embossed portion 17. This provides a good heat conducting path therebetween. As is apparent from this figure, the width of the transformer is almost equal to the internal width of the container so that the transformer may be placed inside with little excess space.

The internal well 18 formed by the embossed portion 17 is best illustrated in the cross section view of FIG. 4. In past ballast constructions having an overall rectanguloid shape, the internal dimensions of the ballast container were likewise sufficient to allow enclosure of a given ballast transformer with little waste of space. Thus for a given ballast transformer the height and width dimensions overall of the prior art ballast containers are essentially the same as in this figure. However, by having the height dimension made up with the embossed portion, which embossed portion does not cover the entire bottom surface area but is only sufficiently large to form a central well to receive the windings, a certain amount of internal volume is saved by my novel construction in comparison to the prior art ballast construction. Thus the dash lines 20 serve to illustrate a portion of the cross sectional area and indirectly the volume which is eliminated over a straight rectanguloid shape. In the completed ballast assembly, as was earlier brought out, the entire contents of the container are "potted" with a suitable electrically insulative heat conducting material such as asphalt or a thermosetting solid fill material. Typically the fill in liquid form is poured into the ballast container and fills all voids and cracks. The cover is snapped into place and the filler material is allowed to cure to complete the assembly. As a result of the reduction in internal volume, the amount of fill material needed to fill the voids within the container is reduced perhaps as much as 15 percent. For an example of savings, in one case a prior art ballast container was formed of 0.0299 cold rolled steel and had inner dimensions of 3.126 by 2.655 by 15.5 inches. After installation of the ballast transformer and other components in that container approximately 3.23 pounds of potting material was required to fill the voids. The same transformer and components installed in the ballast container of the invention required approximately 2.7 pounds of the potting material to fill the voids remaining in the container. This is a savings of 0.532 pounds of potting material per ballast or about 16 percent.

Figure 5:
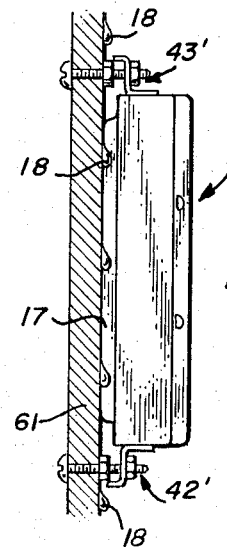
FIG. 5 illustrates, symbolically, vertical mounting on a vertical support member the ballast container of my invention.
Figure 6:
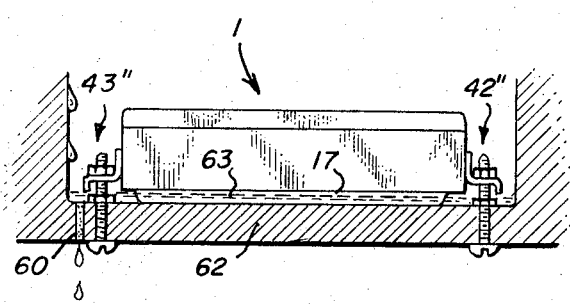
FIG. 6 illustrates, symbolically, horizontal mounting on a horizontal support member the ballast container of my invention.

Reference is now made to the illustrations of FIG. 5 and FIG. 6 which show symbolically the kind of water resistance obtained by my novel ballast in both the horizontal and vertical mountings. Thus in FIG. 5 the ballast is mounted by brackets 42' and 43' to a vertical wall member 61. The bottom surface of the embossed portion 17 is thus clamped against the vertical support member. Water running down along the vertical support member like droplets, 18, as is apparent, may hit the sides of the protruding portion 17 and run down therealong past ballast 1. Inasmuch as the embossed portion 17 is connected integrally to the remainder of the ballast, without seams, no openings exist that allow such running water to enter the ballast container. As is apparent, the seams which do exist in the end walls of the containers are effectively raised and spaced from support wall 61. Similarly in FIG. 6 the ballast is mounted along a horizontal sign member 62. Inasmuch as the embossed portion 17' raises or spaces the side seams a predetermined distance off the bottom surface, the water level 63 must rise, as through the accumulation due to a clogged drain 60, within the sign frame before it reaches the level of the seams and only then can such water enter the ballast container.

With this ballast container construction I thus achieve many of the desired characteristics of water resistance which is found in the construction of my prior invention but at a substantially reduced manufacturing cost. Concurrently I have reduced the amount of fill material used to fill the voids in the ballast and this inherently provides conservation of material resources as well as a further savings in manufacturing cost.

The foregoing embodiment of my invention is intended to illustrate and teach one skilled in the art how to make and use my invention and is not intended to limit the invention to any particular details inasmuch as other changes and modifications or improvements become apparent to one skilled in the art upon reading this specification. Accordingly it is requested that my invention be broadly construed within the full spirit and scope of the appended claims.

What I claim is:

1. In combination:

a shell-type transformer of the type having an elongated rectangular magnetic iron core, said core including first and second outer legs and a center leg, said legs being spaced from one another with said center leg between them, and a pair of side legs for completing a magnetic path between said outer and centerlegs at each of the ends thereof, a primary winding and at least one secondary winding mounted side-by-side on said center core leg, said transformer having a given height defined by the distance between upper and lower peripheral portions of said primary and said secondary windings and a width defined by the distance between the outer edges of said outer legs and a predetermined length defined by the distance between said side legs;

an elongated generally rectangularly shaped container of sheet metal material for confining said transformer, said container having elongated front and rear walls, opposed right and left end walls adjoining said front and rear walls on opposite ends thereof, a bottom wall, and a top wall, said top wall comprising a detachable lid;

a plurality of flaps integral with the ends of each of said bottom, front and rear walls, said flaps being folded over and into the plane of the adjoining end walls to thereby define seams between said flaps and said end walls;

said bottom wall having an embossed portion protruding by a predetermined distance from the remainder of said bottom wall, said embossed portion with the remainder of said bottom wall defining a rim bordering said embossed portion, said embossed portion having a generally flat outer surface, and said embossed portion comprising a major portion of said bottom wall surface for spacing said seams from the bottommost surface of said embossed portion, said embossed portion further defining an interior well portion bordered by the remaining internal bottom wall surface internally of said container for receiving a portion of said primary and said secondary windings, said well portion having a width less than the width of the transformer and greater than the width of said coils, and said well portion having a length greater than the length of said transformer and said well portion having a depth less than one-half the height of said transformer, and where in the said container the distance between the inner surface of said top wall and the bottom of said well portion is only slightly larger than the height of said transformer;

said transformer being located in said container with the outer periphery of said windings in contact with the bottom surface of said well portion to provide a heat conducting path therebetween;

first and second lead exits in said respective right and left end walls;

electrical circuitry means, including capacitor means, located in said container;

electrical lead means extending into said container through said exit means for connection to said transformer and said electrical circuitry;

electrically insulative potting material filling substantially all remaining voids inside said container; and mounting means on said container for mounting said container with the embossed portion adapted for contact with a supporting surface.

2. A lamp ballast container housing windings of transformer wire, and comprising an elongated container of sheet metal material having opposed elongated front and back side walls, opposed right and left end walls, an elongated top wall comprising a detachable lid, and an elongated bottom wall, said bottom and side walls having integral flaps folded over and into the plane of an adjoining end wall, and at least one spot weld between each flap and end wall to form a mechanical connection therebetween, said flaps and end walls further defining a seam; lead exit means in each of said end walls; said bottom wall having a drawn central portion therein to define a bordered embossment in said bottom wall covering a major portion of said bottom wall surface for spacing said seams from said bottommost surface of said embossment and for defining a bordered, flat bottomed well internally of said container, said well having its flat bottom covering a major portion of the internal bottom wall surface, and said flat bottommost surface positioned in direct contact with windings of transformer wires disposed in said lamp ballast container.

* * * * *

UNITED STATES PATENT OFFICE
CERTIFICATE OF CORRECTION

Patent No. 3,851,225                Dated November 26, 1974

Inventor(s) Julius Frank Luchetta

It is certified that error appears in the above-identified patent and that said Letters Patent are hereby corrected as shown below:

Name of Assignee, shown as "Limited Systems, Inc.", should be -- Litton Systems, Inc. --. In Column 3, line 4, the word "other" should be -- outer --.

Signed and sealed this 4th day of March 1975.

(SEAL)
Attest:

RUTH C. MASON
Attesting Officer

C. MARSHALL DANN
Commissioner of Patents
and Trademarks